(12) United States Patent
Cohen

(10) Patent No.: US 7,054,852 B1
(45) Date of Patent: May 30, 2006

(54) PERFORMANCE OF JOIN OPERATIONS IN PARALLEL DATABASE SYSTEMS

(75) Inventor: Steven B. Cohen, Redondo Beach, CA (US)

(73) Assignee: NCR Corporation, Dayton, OH (US)

( * ) Notice: Subject to any disclaimer, the term of this patent is extended or adjusted under 35 U.S.C. 154(b) by 367 days.

(21) Appl. No.: 09/863,638

(22) Filed: May 23, 2001

(51) Int. Cl.
*G06F 17/30* (2006.01)

(52) U.S. Cl. .............................. 707/2; 707/707; 707/3; 707/7; 707/8; 707/10; 707/100; 707/200

(58) Field of Classification Search ............. 707/2–10, 707/100, 101, 201, 202; 709/202
See application file for complete search history.

(56) References Cited

U.S. PATENT DOCUMENTS

| | | | | |
|---|---|---|---|---|
| 5,655,080 A | * | 8/1997 | Dias et al. ................... | 709/202 |
| 5,666,525 A | * | 9/1997 | Ross .............................. | 707/2 |
| 5,864,842 A | * | 1/1999 | Pederson et al. .............. | 707/3 |
| 6,112,198 A | * | 8/2000 | Lohman et al. ................ | 707/3 |
| 6,625,593 B1 | * | 9/2003 | Leung et al. ................... | 707/2 |

* cited by examiner

*Primary Examiner*—Jean M. Corrielus
*Assistant Examiner*—Fred Ehichioya
(74) *Attorney, Agent, or Firm*—Trop, Pruner, Hu P.C.; Harden Stevens

(57) ABSTRACT

A database system includes a plurality of storage modules, with a first storage module storing rows of a first table and a second storage module storing rows of a second table, and a plurality of access modules adapted to manage access of respective storage modules. A first access module corresponds to the first storage module, and a second access module corresponds to the second storage module. The first access module is adapted to distribute rows of the first table to the second access module in response to a join request, and the first access module is adapted to further distribute row identifiers with the distributed rows. The distributed rows contain one or more columns that are part of one or more join conditions of the join request, but does not contain one or more columns that are in a specified result list of the join request or that are part of a subsequent operation specified in the join request.

30 Claims, 5 Drawing Sheets

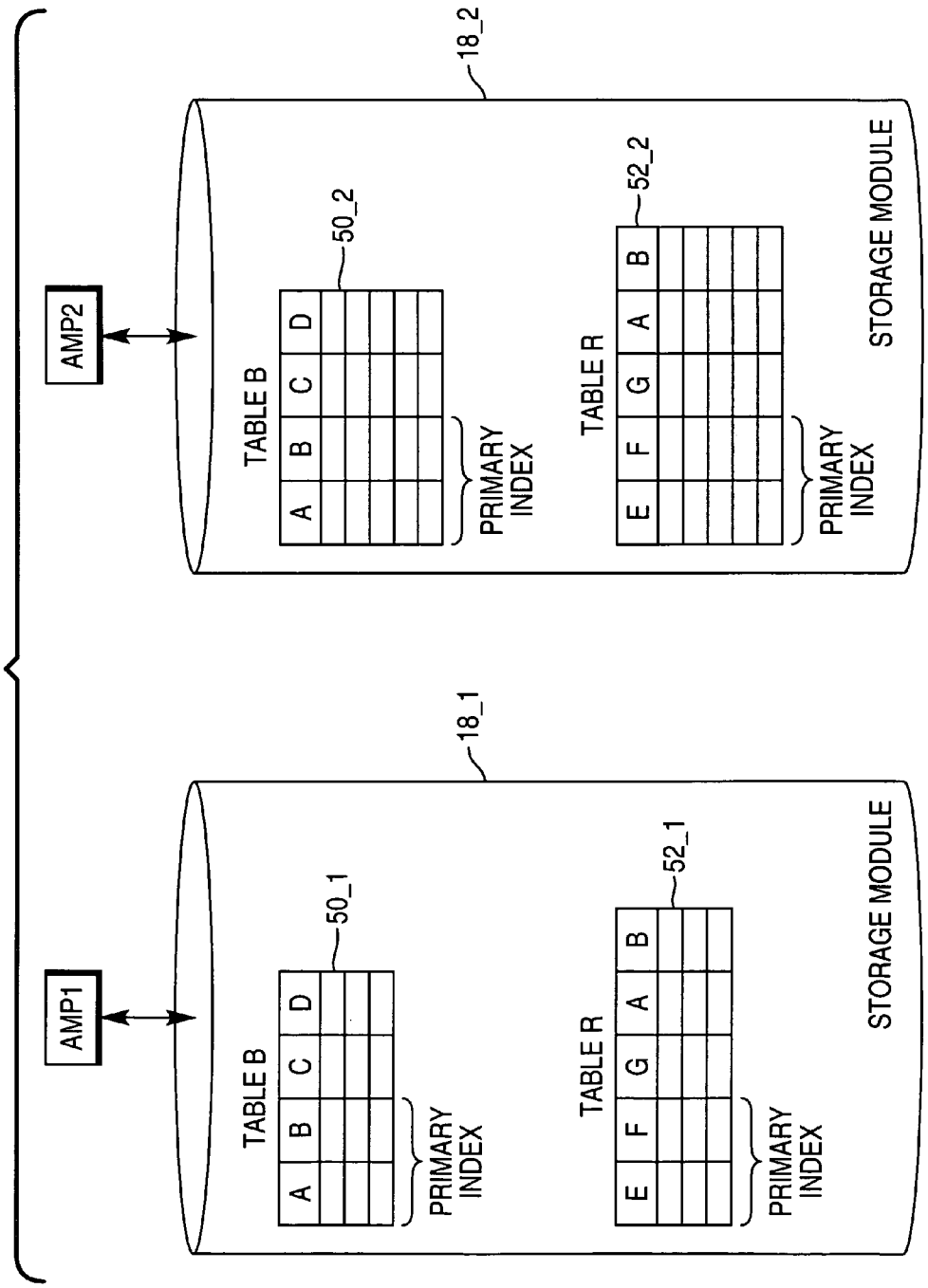

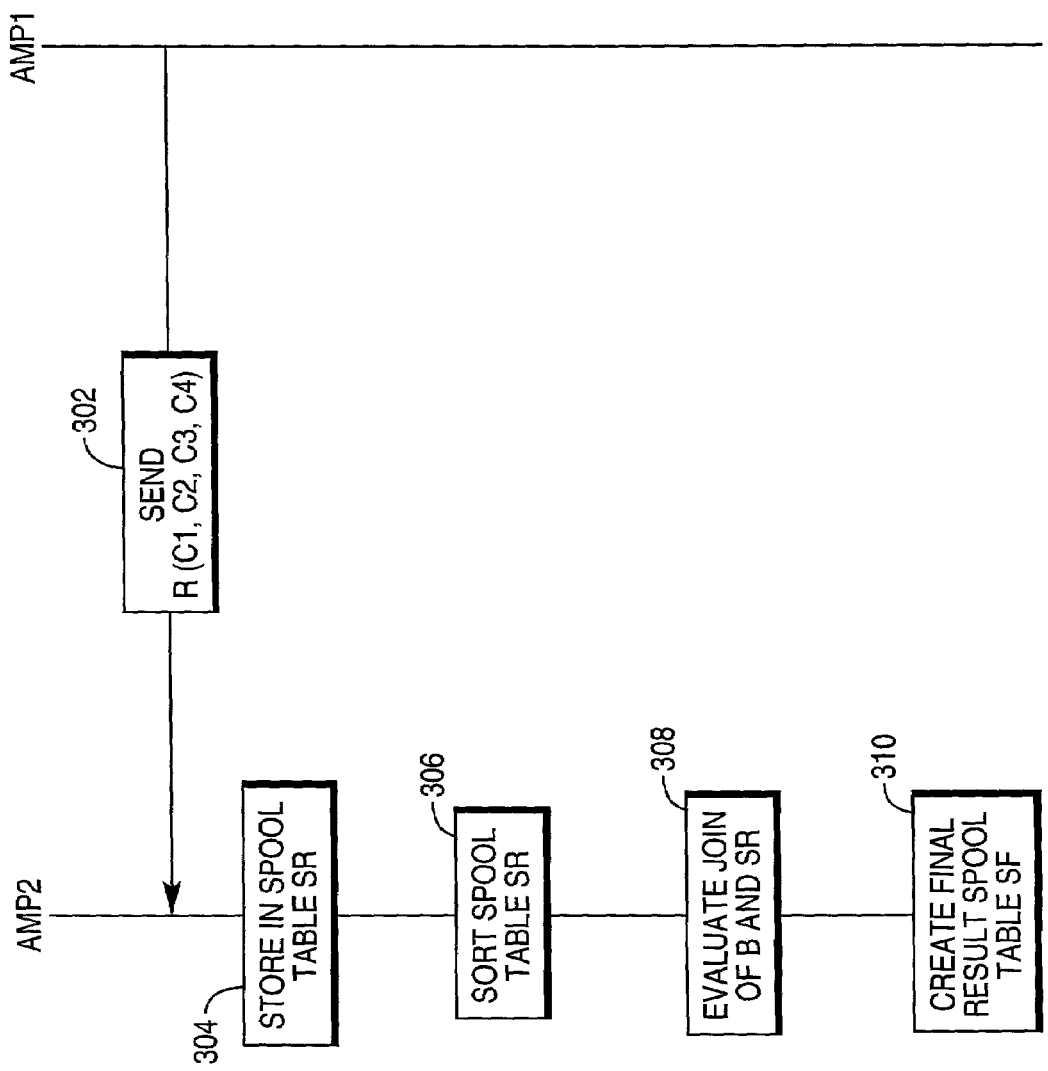

PERFORMANCE OF JOIN OPERATIONS IN PARALLEL DATABASE SYSTEMS

BACKGROUND

A database is a collection of stored data that is logically related and that is accessible by one or more users. A popular type of database system is the relational database management system, which includes relational tables made up of rows and columns. Each row represents an occurrence of an entity defined by the table, with an entity being a person, place, or thing about which the table contains information.

To extract data from a relational table, queries according to a standard database-query language (e.g., Structured Query Language or SQL) can be used. Examples of SQL statements include INSERT, SELECT, UPDATE, and DELETE. The SELECT statement is used to retrieve information from the database and to organize information for presentation to the user or to an application program. The SELECT statement can also specify a join operation to join rows of multiple tables. A common type of join operation is a simple join (or equijoin), which uses an equal (=) comparison operator to join rows from multiple tables. Another type of join is a non-equijoin, which is based on operators other than the equal comparison (e.g., >, <, etc.).

Some database systems, such as the TERADATA® system from NCR Corporation, have multiple access modules to provide a massively parallel processing (MPP) database system. An access module manages a predefined storage space of the database and manages access of data stored in the predefined storage space. Typically, in a parallel database system having a plurality of access modules, each table is distributed across the plurality of access modules. Thus, for each table, some rows are stored in storage space associated with one access module, while other rows are stored in storage space associated with one or more other access modules. By distributing the rows of each table among plural access modules, concurrent processing of data in a target table by the access modules can be performed to improve database speed and performance.

In a TERADATA® database system, a primary index is used to assign a row of a table to a given access module. A primary index is defined at table creation. A primary index can be defined to include a single column or a combination of columns. One of multiple access modules is identified by passing a primary index value through a hashing algorithm. The output of the hashing algorithm contains information that points to a specific one of plural access modules that a row is associated with.

To perform a join operation, it is sometimes necessary to redistribute certain rows of one table from a given access module to another access module. Redistribution takes up database bandwidth, with the cost of redistribution being proportional to the size of the rows being distributed. In other words, the larger the redistributed rows, the greater the cost of redistribution.

SUMMARY

Generally, a method and apparatus is provided to enhance join operations in a parallel database system having plural access modules. For example, a method includes storing rows of a first table in a first storage module, storing rows of a second table in a second storage module, and receiving a request to perform a join of the first and second tables. Rows and one or more columns of the rows of the first table are distributed, in response to the join request, from the first storage module to the second storage module, and row identifiers of the distributed rows are sent with the distributed rows.

Other or alternative features will become apparent from the following description, from the drawings, and from the claims.

BRIEF DESCRIPTION OF THE DRAWINGS

FIG. 2 illustrates distribution of tables among multiple storage modules in the database system of FIG. 1.

FIG. 4 is a flow diagram of a conventional join plan.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
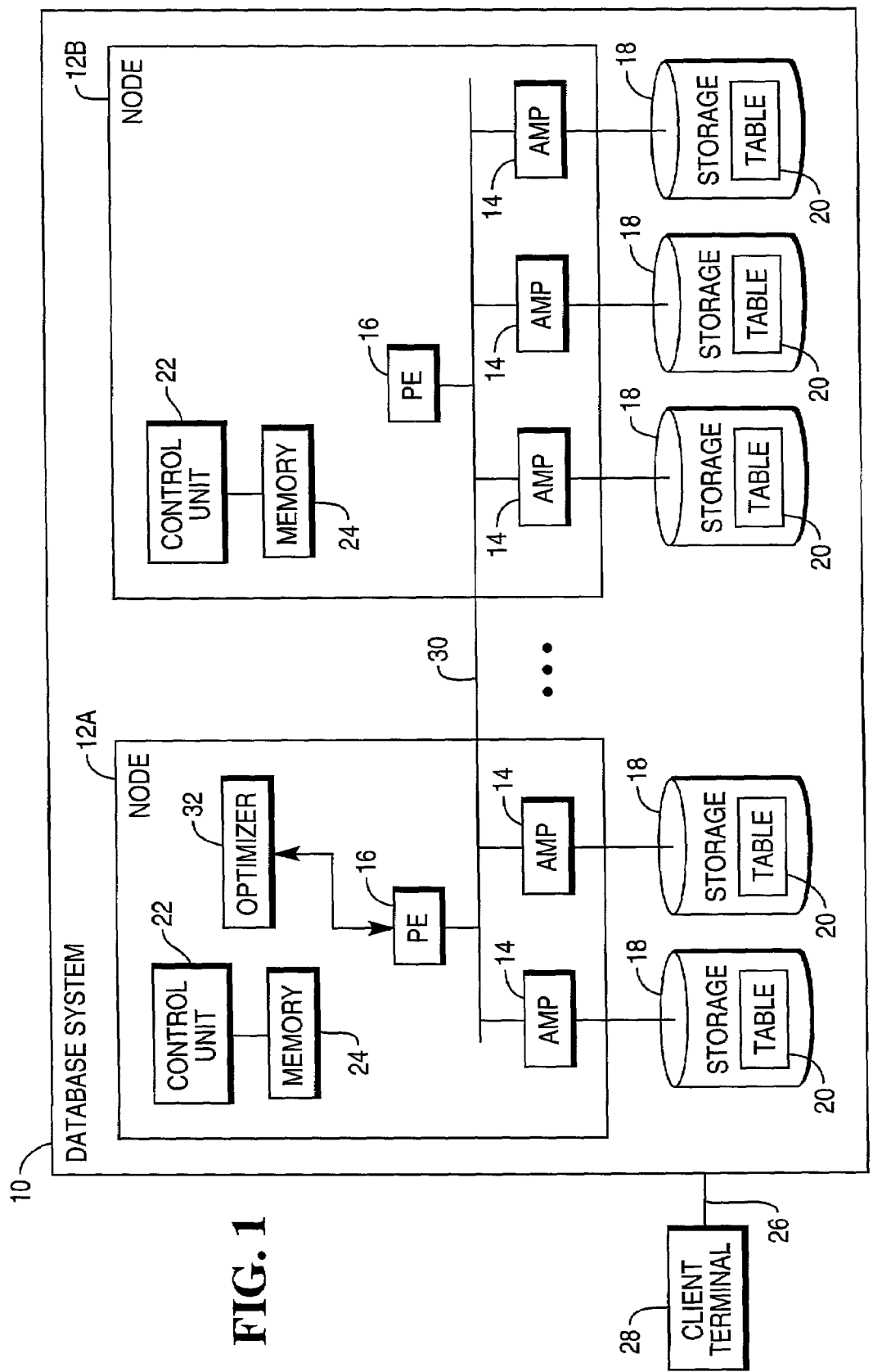
FIG. 1 is a block diagram of an example database system.

FIG. 1 shows a database system 10 that is accessible by one or more client terminals 28. The client terminal 28 is coupled to the database system 10 over a link 26. As examples, the link 26 can be a local area network (LAN), wide area network (WAN), or other type of communications channel. From the client terminal 28, a user or software application is able issue database queries to extract data stored in the database system 10. Such queries are according to a standard database-query language, such as the Structured Query Language (SQL) from the American National Standards Institute (ANSI). One version of SQL is the SQL-92 Standard, while another version is the SQL-99 Standard (also referred to as the SQL-3 Standard).

The database system 10 includes a plurality of nodes 12A, 12B each containing various elements. In one example, each node 12 (12A or 12B) includes one or more access module processors (AMPs) 14, such as AMPs used in a TERADATA® database system from NCR Corporation. Although reference is made to the TERADATA® database system, the invention is not so limited in scope. Some embodiments of the invention can be incorporated into other types of database systems.

Each AMP 14 is responsible for managing access of a respective portion of the database. More generally, the AMP is referred to as an "access module" to refer to any control module (whether implemented in software, hardware, or both) that manages access (including reads and writes) of data stored in the database. In some configurations, the access module is also able to manage the definition (e.g., creation, modification) of tables in the database. Each AMP 14 is associated with a respective storage module 18, sometimes referred to as a virtual disk. Although shown as being separate, the storage modules 18 in the database system 10 in some cases are actually part of the same physical storage device or system (such as a disk array system). The arrangement shown in FIG. 1 is one example of a massively parallel processing (MPP) database system. In another arrangement, a database system includes a single node having plural processors, which is an example of a symmetric multiprocessing (SMP) system. These systems are generally referred to as "parallel database systems" due to the presence of plural access modules (implemented as software, hardware, or a combination thereof).

The AMPs 14 are coupled by an interconnect layer 30 that handles internal communications among the AMPs as well as between the AMPs and parsing engines (PEs) 16. Each of the nodes 12 includes one or more parsing engines 16 (or none). When a parsing engine receives an SQL statement from a client application, the parsing engine interprets the statement, checks it for proper SQL syntax, and sends out executable steps to be performed by one or more AMPs 14. The parsing engines 16 and AMPs 14 are software modules that are executable on one or more control units 22 in each node 12. The control units 22 are coupled to one or more memory modules 24.

An optimizer module 32 is also present in one of the nodes 12 (e.g., 12A). For a given query, the optimizer module 32 selects a lowest cost (or lower cost) execution or access plan from among a plurality of possible plans. In one example, cost is defined as the amount of time and system resources needed to perform an execution plan.

To enable parallel processing, each table in the database is divided into plural table portions 20 and distributed among plural AMPs 14. As shown in FIG. 1, the table portions 20 are stored in respective storage modules 18. A database typically includes a large number of tables for storing data.

In one embodiment, rows of each table are distributed among the plural AMPs 14 based on a primary index of the table. A primary index can be defined to include a single column or a combination of columns. For a given row, its primary index is passed through a hashing algorithm, with the output of the hashing algorithm producing an indication of which AMP 14 the given row is to be associated with.

FIG. 2 shows an example where tables B and R are distributed across AMP1 and AMP2. Thus, a first portion 50_1 of table B is stored in a storage module 18_1 associated with AMP1, and a second portion 50_2 of table B is stored in a storage module 18_2 associated with AMP2. A first portion 52_1 of table R is stored in the storage module 18_1, and a second portion 52_2 of the table R is stored in the storage module 18_2. Table B contains columns A, B, C, and D, while table R contains columns E, F, G, A, and B. Although the example shows tables distributed across two AMPs, tables can actually be distributed across more than two AMPs if they are present in the database system.

It is not uncommon for different tables to use different primary indexes. In the example of FIG. 2, the primary index for table B includes columns A and B, while the primary index for table R includes columns E and F. As a result, distribution of rows of the different tables among the plural AMPs 14 is different due to use of different primary indexes. To perform a join operation of two or more tables, it may become necessary to redistribute certain rows of one table (or more than one table) from one AMP to another AMP. Depending on the size of the rows being redistributed, it may be more efficient to use an alternate join plan according to some embodiments of the invention in which only a selected few columns of the rows are distributed. Selection of the more efficient join plan is performed by the optimizer module 32.

To perform the alternate join plan according to an embodiment, redistribution of rows of a table from one AMP to another is still performed for some join operations; however, the amount of data sent in each redistributed row is potentially reduced. At the receiving AMP, the received rows are stored in a spool table, and a temporary or dynamic index is created out of the spool table to enable an efficient nested join (explained further below).

For a join operation, the columns of a table are divided into five general categories:

C1: columns that are part of the join condition;

C2: columns that are part of residual conditions;

C3: columns that are part of a user specified result list;

C4: columns that are required for subsequent operations; and

C5: all other columns of the table.

Generally, C1 columns are the columns that are part of the join condition—these are the columns that determine how rows between two tables are actually matched up (e.g., hash join, merge join, product join, etc.). The C2 columns are the columns that are needed to evaluate another condition (the residual condition) that is not the join condition itself. This residual condition is applied after two candidate rows have passed the join condition. The C3 columns are the columns specified in the SELECT clause of a SELECT statement that specifies a join. C4 columns are present if another operation (referred to as "subsequent operation") is specified by the join request after the join of tables.

In one example, a join operation can be performed according to the following SQL statement:

| | |
|---|---|
| SELECT | T1.A, T3.B |
| FROM | T1, T2, T3 |
| WHERE | T1.X = T2.X AND T1.Y = T2.Y AND T1.Z + T1.W > T2.N |
| AND | T2.L = T3.M |
| AND | T3.P > T1.F |

T1, T2, and T3 refer to three different tables. T1.A represents attribute (or column) A of table T1; T3.B represents attribute (or column) B of table T3; and so forth. In the WHERE clause of the SELECT statement, three join expressions are specified: a T1/T2 join expression (in the first line of the WHERE clause); a T2/T3 join expression (in the second line); and a T3/T1 join expression (in the third line). Since performing a three-way join in a single stage is typically not available, the three-way join of tables T1, T2, and T3 is actually divided into two separate two-way joins. The optimizer module 32 selects an order in performing the joins that is most efficient. For example, the selected join order can be as follows: (T1 join T2) join T3, in which T1 is first joined with T2, followed by joining the result of the first join with T3.

Considering the first join of T1 and T2, and assuming table T1 is the table being redistributed, columns X and Y of table T1 are in category C1, since X and Y are part of the join condition. Columns Z and W of table T1 are in category C2, since they are part of the residual condition T1.Z+T1.W>T2.N. Column A of table T1 is in category C3, since it is specified in the result list (T1.A, T3.B) of the SELECT statement. Column F is in category C4, since column F of table T1 is required for a subsequent operation, namely the operation for the third join expression T3.P>T1.F. Thus, in a conventional join operation of tables T1 and T2, columns X, Y, Z, W, A, and F (in categories C1–C4) of table T1 are redistributed.

The column classification is based on which join is being performed and which table is being redistributed. If table T2 instead of table T1 is being redistributed, then columns X and Y are in category C1, column N is in category C2, column B is in category C3, and column L is in category C4. In most cases, in a join of two tables, rows of both tables will likely be redistributed.

Conventionally, in response to a join operation, columns in categories C1, C2, C3, and C4 of a first table are redistributed from one AMP to another AMP and/or sorted and temporarily stored in a spool table. In the example where table T1 is redistributed, the redistribution of columns A (category C3) and F (category C4) is not really necessary for the join of T1 and T2. Thus, redistribution of the C3 and C4 columns in a join operation may unnecessarily consume bandwidth in the interconnect layer 30 between AMPs 14, which reduces overall system performance. To improve performance in accordance with some embodiments, the optimizer module 32 is able to select a join plan (the alternate join plan) that is performed without exchanging the C3 and C4 columns. To do so, the alternate join plan distributes row identifiers along with the C1 and C2 columns, which are columns that are part of the join condition or part of the residual condition. C3 and C4 columns of the first table are not redistributed. In addition, since only a subset of all the columns (C1, C2, C3, and C4 columns) needed to perform the requested join operation are redistributed among AMPs in the alternate join plan, a temporary hashed index is generated in the receiving AMP, with the temporary hashed index used to map to a row identifier of the first table. The temporary index allows efficient access of the non-distributed columns of the first table.

Whether join performance is actually improved by using the alternate join plan depends on the relative size of the combined C3 and C4 columns and the size of the distributed row identifiers, along with other factors. One such other factor is the location of the result of the join operation after the join operation has been performed. An aspect of conventional techniques in performing join operations is that the final spool file (containing the join results, such as the join of tables T1 and T2 in the example above) is located in the storage module associated with the AMP that performed the join operation. Thus, if the spool file (containing C1, C2, C3, and C4 columns) has to be redistributed to another AMP to perform some other operation, such as another join operation, an aggregate operation, and so forth, the additional redistribution further consumes bandwidth of the database system. Thus, rows containing all four of the C1, C2, C3, and C4 columns may potentially be redistributed twice (or even more times).

It is noted that the alternate join plan is not superior to conventional join plans in all cases. Thus, it is up to the optimizer module 32 to select the join plan that is most efficient for the given join query.

Figure 3A:
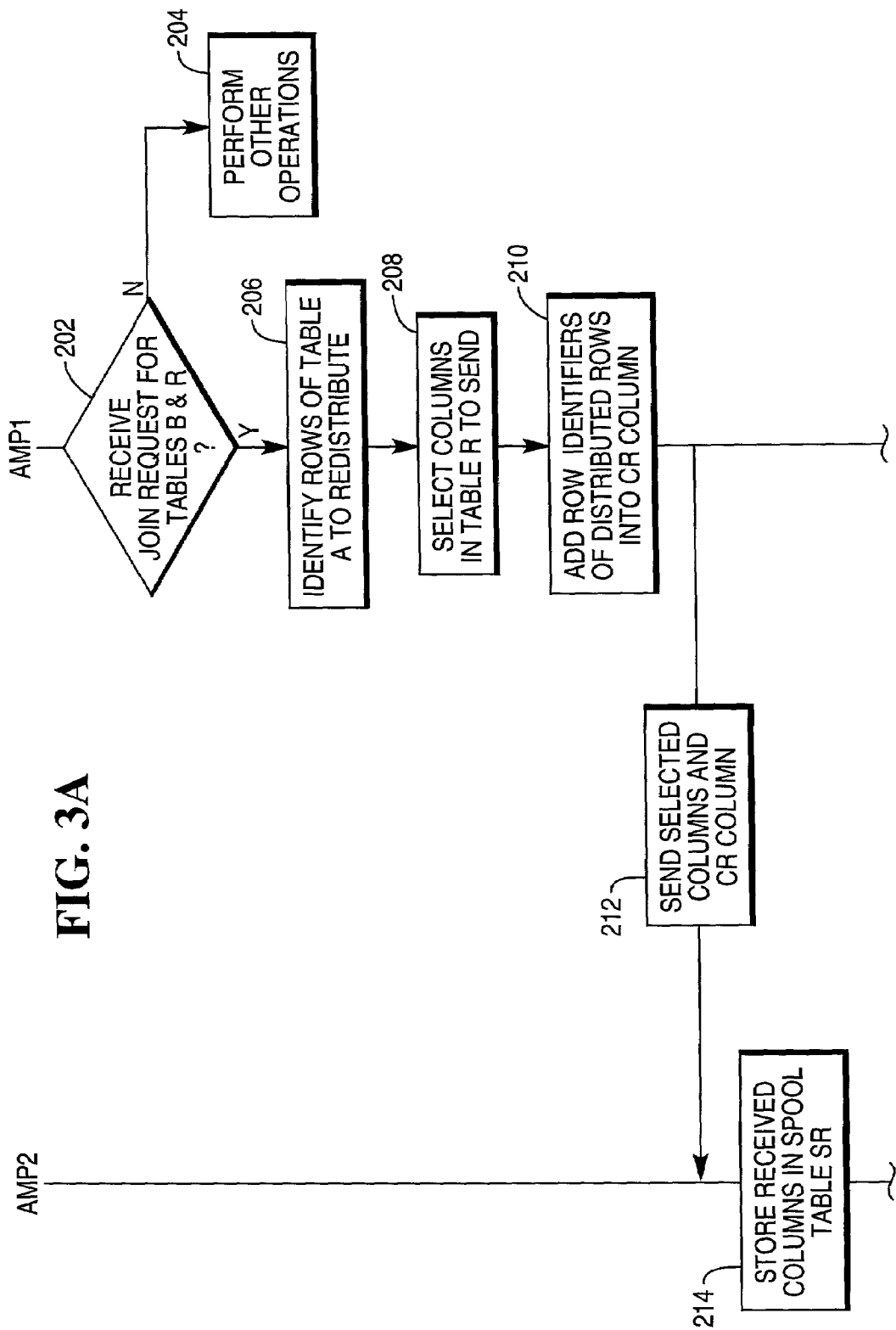
FIGS. 3A–3B are a flow diagram of a join plan according to one embodiment performed by access modules in the database system of FIG. 1.
Figure 3B:
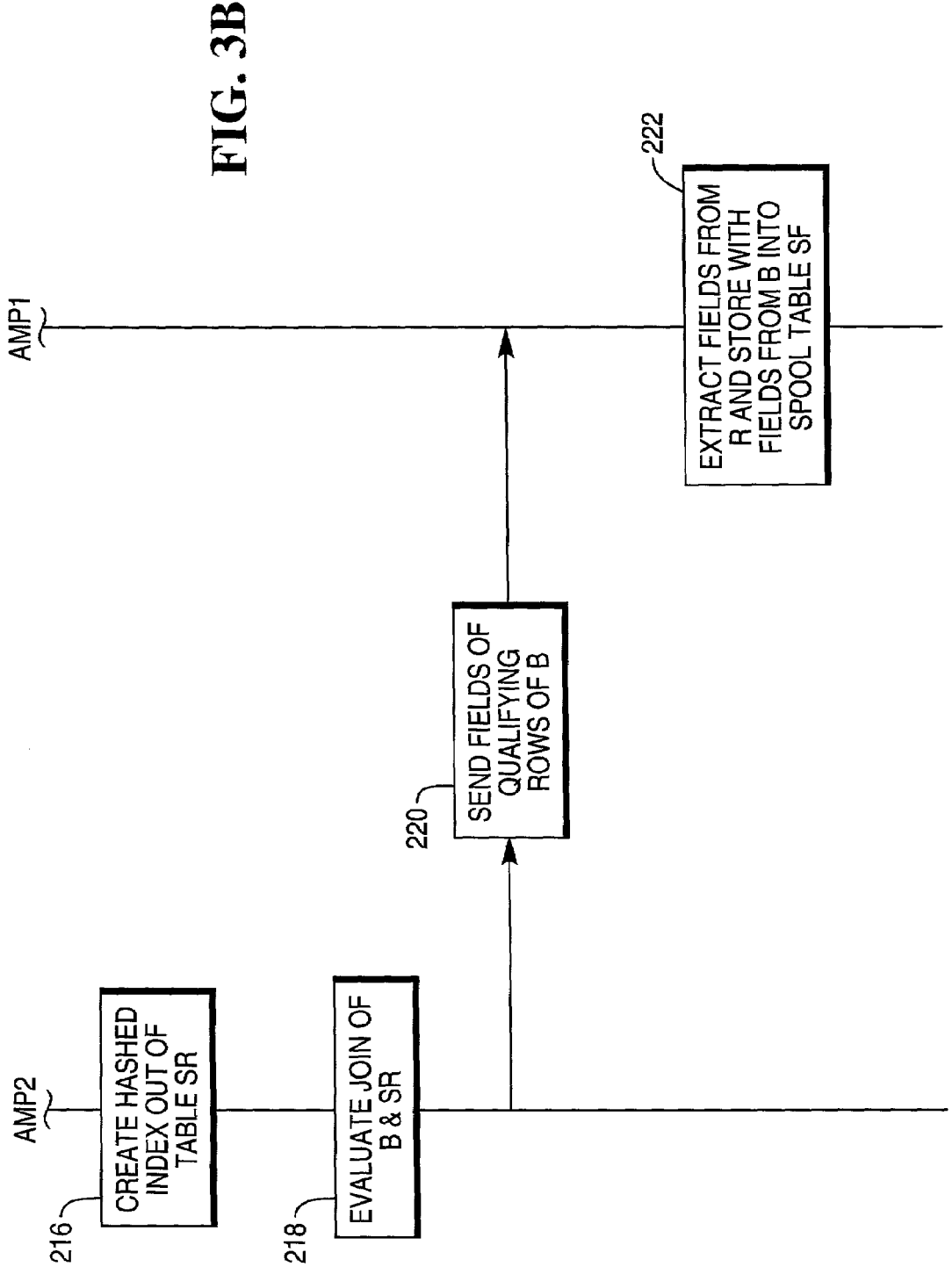

FIGS. 3A–3B illustrate the processing of a join operation according to the alternate join plan, in accordance with one embodiment. To simplify the discussion, the flow is described from the view of two AMPs (AMP1 and AMP2), where it is assumed that data from AMP1 is redistributed to AMP2. However, in other examples, there will be more AMPs involved, and rows are sometimes distributed among the multiple AMPs.

In the ensuing description, the following abbreviations are used: B represents a table that does not require redistribution; R represents the other table in the join, with R being the table that is redistributed; SR is the spool table that is created as a result of the redistribution; and SF is the spool table containing the final result of the redistribution. Portions of tables B and R are stored on storage modules associated with both AMP1 and AMP2.

AMP1 determines (at 202) whether it has received a request to join two tables B and R. If not, then another operation is performed (at 204). However, if a join request has been received, AMP1 identifies (at 206) rows of table R to redistribute. Next, AMP1 selects (at 208) columns in table R to send as part of the redistribution. As noted above, only columns of types C1 and C2 (referred to as C1 columns and C2 columns) are selected for redistribution. AMP1 adds the row identifier (at 210) for each row of table R that is being redistributed into a column CR. The column CR is sent along with C1 and C2 columns. In some embodiments, the row identifier is stored with each row of the table R.

In a table that is hash partitioned and hash ordered, a row identifier includes the row hash (which is the primary index applied through a hashing algorithm) in combination with a uniqueness value. Hash partitioning refers to the partitioning of rows of a table across plural AMPs using the hashed value (or hash code) of the primary index of the table. Hash ordering refers to the ordering of the rows of the table using the hashed value of the primary index.

The selected columns are sent by AMP1 (at 212) to the target AMP (AMP2). Upon receiving the columns, AMP2 stores (at 214) the received columns (C1+C2 columns and the CR column) into a spool table SR. AMP2 then creates (at 216) a hashed index out of spool table SR. Once the C1, C2, and CR columns are stored in the SR table, the SR table is sorted. In one embodiment, the sorting is based on hashed codes generated by applying C1 column(s) of the SR table through a hash algorithm. The goal is to sort the SR table so that the rows are ordered in the same way as table B to improve the efficiency of the join of B and SR. With SR sorted, AMP2 avoids having to perform full table scans of the SR table when performing the join, which is typically inefficient.

The temporary index created at 216 is based on the combination of the generated hash code, the sorted set of rows in the SR table, and the row identifiers of the CR column. The index allows a C1 column (in table B) to be matched to a CR entry (containing a row identifier of a corresponding row in table R on AMP1). The temporary index enables an efficient nested join of tables SR, B, and R despite the fact that the join is performed on different AMPs. Note that tables SR and B are located on AMP2 while table R is located on AMP1.

In the nested join, AMP2 evaluates (at 218) the join of B and SR. For each row that qualifies (according to the specified join condition and residual conditions), AMP2 sends (at 220) required fields of each qualifying row from table B back to the originating AMP (AMP1). The required fields from table B includes C3+C4 columns from table B. The C3+C4 columns are columns from table B that are part of the specified result list (in the SELECT clause of the join query) and that are to be used in subsequent operations. The temporary index generated at 216 enables the matching of the qualifying rows of table B with corresponding row identifiers in the CR column in the spool table SR. The originating AMP (AMP 1) is identified by the CR row identifier. The row identifiers in column CR (from table SR) are sent with the C3+C4 columns of table B back to AMP1. Thus, for each row of table B that satisfies the join condition and residual conditions, the fields of the rows sent back to AMP1 include the C3+C4 columns and the CR column. Upon receiving the fields from AMP2, AMP1 retrieves (at 220) the rows identified by the corresponding row identifiers in column CR and extracts the necessary fields from table R to add to the final result in a spool table SF. The spool table SF contains the following information: C3+C4 columns of table B associated with rows that satisfy the join and residual conditions of the join query; and C1–C4 fields of rows from table R identified by row identifiers in column CR in rows communicated from AMP2.

The alternate join plan is contrasted with one example of a conventional join plan, which is shown in FIG. 4. Upon receiving a join query, AMP1 redistributes (at 302) C1+C2+C3+C4 columns of table R to AMP2. AMP2 stores (at 304) the received information in a spool table SR. The spool table SR is then sorted (at 306) by generating a hashed code, using the C1 column(s) for example. This is similar to the sort performed in the alternate join plan. Next, the join of SR and B is performed, in which the join of SR and B is evaluated (at 308) to select rows that match the join and residual conditions. The matching rows are then stored (at 310) in a final result spool table SF.

A cost comparison of the alternate join plan and conventional join plan is provided below. Instead of initially distributing rows containing C1+C2+C3+C4 columns (302 in FIG. 4) in response to a join request, the alternate join plan distributes (212 in FIG. 3A) rows containing C1+C2 columns and a CR column containing the row identifier. Thus, whether cost savings is achieved depends on the relative sizes of each entry of the CR column and entries of the C3+C4 columns. The optimizer module 32 compares the relative sizes. In most cases, cost savings is available only if the size of the row identifier is less than the size of the C3+C4 columns.

In addition, if the size of the CR column is less than that of the C3+C4 columns, cost savings can also be achieved when storing distributed columns into the spool table SR (214 in FIGS. 3A and 304 in FIG. 4). If CR is smaller, there is less data to store into SR.

Given the same table size, the costs of the temporary index creation operation (216 in FIG. 3B) and sort operation (306 in FIG. 4) of the SR table are about the same. However, if the size of CR is less than that of the C3+C4 columns, which means the SR table for the alternate join plan is smaller than the SR table for the conventional join plan, the cost of the index creation operation (216 in FIG. 3B) is less than that of the sort operation (304 in FIG. 4).

Evaluating the join of tables B and SR (218 in FIGS. 3B and 308 in FIG. 4) is also less costly if SR is smaller. However, distribution of rows of table B from AMP2 back to AMP1 (220 in FIG. 3B) is not performed in a conventional join plan. Thus, this operation adds to the cost of the alternate join plan. The relative sizes of the R.C1 and R.C2 columns (C1+C2 columns of table R) versus the B.C3 and B.C4 columns is a factor in determining if the alternate join plan is more efficient than the conventional join plan.

The operation of retrieving qualifying fields from table R (222 in FIG. 3B) is also not performed in a conventional join plan, and thus is also an additional cost of the alternate join plan. Note that the acts 220 and 222 are not performed in a conventional join plan since the final result spool table SF resides in AMP2 (instead of AMP1 in the alternate join plan). However, if a subsequent operation requires that SF be distributed to AMP1 anyway, then the alternate join plan can still achieve cost savings over the conventional join plan since distributing the larger SF table (containing C1+C2+C3+C4 columns) is more costly than operations 220 and 222.

The example given above assumes that only one table (table R) is redistributed. However, techniques discussed here are also applicable for joins where both tables (table R and table B) are redistributed, and for joins that involve a larger number of tables and AMPs. In the scenario where both tables that are part of the join are redistributed between AMPs, each table is examined by the optimizer module 32 to determine if the alternate join plan would result in a less costly execution plan. The result may be that the alternate join plan is used for both tables, only one of the tables, or neither of the tables to achieve a less costly execution plan.

Further, the above assumes that table R is hash partitioned and hash ordered. In other embodiments, the table R can be hash partitioned and value ordered, value partitioned and hash ordered, or value partitioned and value ordered. If the table R is hash partitioned and value ordered, then the row identifier includes the hash code (hashed primary index) plus fields making up the value ordering. If the table R is value partitioned and hash ordered, then the row identifier includes a hashed primary index and a uniqueness value, as is the case with hashed partitioned and hash ordered table, plus fields making up the value partitioning. If the table R is value partitioned and value ordered, then the row identifier includes fields making up the value partitioning or value ordering.

In all these cases, the optimizer module 32 determines whether the alternate join plan is more cost effective based on a comparison of the size of the C3+C4 columns and the size of the row identifier. Only if the size of the C3+C4 columns is larger than the size of the row identifier (in column CR) is there a potential for cost savings.

The database system discussed above includes various software routines or modules. Such software routines or modules are executable on corresponding control units. The various control units include microprocessors, microcontrollers, or other control or computing devices. As used here, a "controller" or "processor" refers to a hardware component, software component, or a combination of the two. A "controller" or "processor" can also refer to plural hardware components, software components, or a combination of hardware components and software components.

Instructions of the various software routines or modules discussed herein are stored on one or more storage units in the corresponding systems and loaded for execution on corresponding control units. The storage units include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact disks (CDs) or digital video disks (DVDs).

The instructions of the software routines or modules are loaded or transported into the system in one of many different ways. For example, code segments including instructions stored on floppy disks, CD or DVD media, a hard disk, or transported through a network interface card, modem, or other interface device may be loaded into the node and executed as corresponding software routines or modules. In the loading or transport process, data signals that are embodied in carrier waves (transmitted over telephone lines, network lines, wireless links, cables, and the like) may communicate the code segments, including instructions, to the node. Such carrier waves are in the form of electrical, optical, acoustical, electromagnetic, or other types of signals.

While the present invention has been described with respect to a limited number of embodiments, those skilled in the art will appreciate numerous modifications and variations therefrom. It is intended that the appended claims cover such modifications and variations as fall within the true spirit and scope of this present invention.

What is claimed is:

1. A method for use in a database system having plural storage modules, comprising:
   storing rows of a first table in a first storage module;
   storing rows of a second table in a second storage module;
   receiving a request to perform a join of the first and second tables;
   distributing, in response to the join request, rows and one or more columns of the rows of the first table from the first storage module to the second storage module; and
   sending row identifiers of the distributed rows with the distributed rows.

2. The method of claim 1, further comprising identifying the one or more columns of the first table that are part of one or more conditions of the join request.

3. The method of claim 2, wherein identifying the one or more columns that are part of the one or more conditions comprises identifying the one or more columns that are part of a join condition of the join request.

4. The method of claim 3, wherein identifying the one or more columns that are part of the one or more conditions further comprises identifying the one or more columns that are part of a residual condition of the join request.

5. The method of claim 3, wherein distributing the one or more columns does not comprise distributing columns that are part of a specified result list in the join request.

6. The method of claim 5, wherein distributing the one or more columns does not comprise distributing columns that are part of a subsequent operation specified in the join request.

7. The method of claim 3, wherein distributing the one or more columns does not comprise distributing columns that are part of a subsequent operation specified in the join request.

8. The method of claim 1, further comprising storing, in the second storage module, the distributed rows and one or more columns.

9. The method of claim 8, wherein storing the distributed rows and one or more columns comprises storing in a spool table.

10. The method of claim 9, wherein the second storage module is associated with an access module, the method further comprising performing a join, by the access module, of the spool table and the second table.

11. The method of claim 10, wherein performing the join comprises identifying rows of the second table that satisfy one or more conditions of the join request and sending one or more columns of the identified rows from the second storage module to the first storage module.

12. The method of claim 11, wherein sending the one or more columns of the identified rows comprises sending one or more columns of the second table that are part of the specified result list of the join request and that are part of a subsequent operation specified in the join request.

13. The method of claim 12, wherein the first storage module is associated with one other access module, the method further comprising selecting, by the one other access module, rows of the first table corresponding to the identified rows of the second table and placing the selected rows of the first table and identified rows of the second table into a result table.

14. The method of claim 9, further comprising generating a temporary index based on the spool table, the temporary index to match a column of the second table to a row identifier in the spool table.

15. An article comprising at least one storage medium containing instructions executable in a database system having plural access modules to control access of plural storage modules, the instructions when executed causing the database system to:
   store rows of a first table with a first access module;
   store rows of a second table with a second access module;
   receive a join request to join the first table and second table;
   identify one or more columns of the first table that are part of one or more conditions of the join request; and
   distribute the identified one or more columns of the first table from the first access module to the second access module but not distributing columns of the first table that are part of a specified result list of the join request.

16. The article of claim 15, wherein the instructions when executed cause the database system to further:
   distribute rows containing the one or more identified columns of the first table; and
   distribute row identifiers of the distributed rows with the distributed rows.

17. The article of claim 16, wherein the instructions when executed cause the database system to receive, by the first access module, rows of the second table that satisfy the one or more join conditions of the join request.

18. The article of claim 17, wherein the instructions when executed cause the database system to receive the rows of the second table by receiving rows containing one or more columns of the second table that are part of the specified result list in the join request.

19. The article of claim 18, wherein the instructions when executed cause the database system to receive the rows of the second table containing one or more further columns that are part of a subsequent operation specified in the join request.

20. The article of claim 18, wherein the instructions when executed cause the database system to further not distribute columns of the first table that are part of a subsequent operation specified in the join request.

21. The article of claim 17, wherein the instructions when executed cause the database system to further:
   receive the row identifiers of the first table along with the rows of the second table;
   retrieve rows from the first table using the row identifiers; and
   storing rows of first and second tables in a result table.

22. A database system comprising:
   a plurality of storage modules, with a first storage module storing rows of a first table and a second storage module storing rows of a second table;
   a plurality of access modules adapted to manage access of respective storage modules, a first access module corresponding to the first storage module, and a second access module corresponding to the second storage module; and
   the first access module adapted to distribute rows of the first table to the second access module in response to a join request, the first access module adapted to further distribute row identifiers of the distributed rows with the distributed rows.

23. The database system of claim 22, wherein the distributed rows contain one or more columns that are part of one or more join conditions of the join request but do not contain one or more columns that are in a specified result list of the join request.

24. The database system of claim 23, wherein the distributed rows do not contain one or more columns that are part of a subsequent operation specified in the join request.

25. The database system of claim 22, wherein each row of the first table is associated with a primary index, and wherein each row identifier comprises a hash code of the primary index and a uniqueness value.

26. The database system of claim 25, wherein the first table is hash partitioned and hash ordered.

27. The database system of claim 22, wherein the first table is hash partitioned and value ordered, and wherein each row of the first table is associated with a primary index, and wherein each row identifier comprises a hash code of the primary index and a field used for value ordering.

28. The database system of claim 22, wherein the first table is value partitioned and hash ordered, and wherein each row of the first table is associated with a primary index, and wherein each row identifier comprises a hash code of the primary index, a uniqueness field, and a field used for value partitioning.

29. The database system of claim 22, wherein the first table is value partitioned and value ordered, and wherein each row identifier comprises at least one field used for one of value partitioning and for value ordering.

30. A database system comprising:

a plurality of storage modules, with a first storage module storing rows of a first table and a second storage module storing rows of a second table;

a plurality of access modules adapted to manage access of respective storage modules, a first access module corresponding to the first storage module, and a second access module corresponding to the second storage module; and the first access module adapted to distribute rows of the first table to the second access module in response to a join request, the first access module adapted to further distribute row identifiers with the distributed rows, the first access module adapted to further distribute columns of the first table that are part of one or more join conditions of the join request but to not distribute columns of the first table that are part of a specified result list in the join request and subsequent operation of the join request.

* * * * *